United States Patent [19]

Bennett

[11] 4,328,602
[45] May 11, 1982

[54] SAFETY LEG CONSTRUCTION FOR A DOCKBOARD

[75] Inventor: David E. Bennett, Waukesha, Wis.

[73] Assignee: Kelley Company Inc., Milwaukee, Wis.

[21] Appl. No.: 206,023

[22] Filed: Nov. 12, 1980

[51] Int. Cl.³ .............................................. E01D 1/00
[52] U.S. Cl. ................................................... 14/71.3
[58] Field of Search ................................. 14/71.3, 71.1

[56] References Cited

U.S. PATENT DOCUMENTS

| | | | |
|---|---|---|---|
| 3,117,332 | 1/1964 | Kelley | 14/71.3 |
| 3,137,017 | 6/1964 | Pfleger et al. | 14/71 |
| 3,368,339 | 2/1968 | Pfleger | 14/71 |
| 3,528,118 | 9/1970 | Smith | 14/71.3 |
| 3,530,488 | 9/1970 | Beckwith | 14/71.3 |
| 3,858,264 | 1/1975 | Kuhns | 14/71.3 |
| 3,877,102 | 4/1975 | Artzberger | 14/71 |
| 3,902,213 | 9/1975 | Pfleger et al. | 14/71 |
| 3,921,241 | 11/1975 | Smith | 14/71.3 |
| 3,995,342 | 12/1976 | Wiener | 14/71.3 |
| 3,997,932 | 12/1976 | Artzberger | 14/71.3 |
| 4,068,338 | 1/1978 | Artzberger | 14/71.3 |

Primary Examiner—Nile C. Byers, Jr.

Attorney, Agent, or Firm—Andrus, Sceales, Starke & Sawall

[57] ABSTRACT

A safety leg construction for a dockboard which acts to limit normal slow descent of the ramp, as well as rapid descent of the ramp, after a truck pulls away from the loading dock. Legs are hinged to the undersurface of the forward edge of the ramp and are biased to a forward supporting position and can be pivoted to a retracted non-supporting position. The legs are coupled to the lip of the dockboard by a coupling member which is pivoted to the leg and has an abutment positioned to be engaged by a cam attached to the lip as the lip is extended to thereby move the coupling member and the leg to the retracted position. An acceleration responsive latching element serves to lock the coupling member to the leg so under normal operation they move as a unit. Under a rapid gravitational descent of the ramp, caused by an added load on the ramp when the truck pulls away from the dock, the increased acceleration of the ramp will actuate the latching element to release the coupling member from the leg and enable the biasing means to return the leg to the supporting position, independent of the position of the lip and coupling member, to thereby support the ramp against further descent.

8 Claims, 5 Drawing Figures

SAFETY LEG CONSTRUCTION FOR A DOCKBOARD

BACKGROUND OF THE INVENTION

As disclosed in U.S. Pat. No. 3,137,017, cross traffic legs are pivoted to the forward edge of the ramp and are normally biased forwardly to a supporting position. The cross traffic legs are coupled to the lip, so that as the ramp is elevated and the lip is extended, the cross traffic legs will automatically be pivoted to a retracted non-supporting position. After loading, as the truck pulls away from the dock and the lip pivots downwardly from the extended to the pendant position, the cross traffic legs are urged forwardly and engage the fixed supports on the frame of the dockboard to prevent further descent of the ramp.

The cross traffic legs, as illustrated in U.S. Pat. No. 3,137,017, are formed with series of abutments along the length of the legs so that the legs will not only support the ramp in a generally horizontal cross traffic position, but will also support the ramp in a series of below dock level positions.

It has been found that in situations where the truck pulls away from the loading dock while a load, such as a fork lift truck, is on the ramp, the cross traffic legs cannot respond quickly enough to catch or restrain the sudden descent of the ramp. The stored up energy in the compressed pneumatic tires of the lift truck tend to push the ramp down very suddenly when the truck pulls away from the loading dock and the lip and ramp are unsupported. Under these conditions of sudden drop, the lip tends to remain in its extended position with respect to the ramp, thereby maintaining the cross traffic legs in the retracted position and preventing the legs from engaging the supporting stops.

U.S. Pat. No. 3,368,229 is directed to a safety mechanism which is intended to prevent the sudden gravitational descent of the ramp caused by a load on the ramp when the truck pulls away from the dock. In accordance with the disclosure of U.S. Pat. No. 3,368,229, a tube is supported on the dock, and a strut moves up and down with the ramp and is slidable within the tube. The strut has downwardly facing ratchet teeth which coact with the an escapement device on the tube to support the ramp against descent and thereby prevent accidental descent of the ramp. An inertia responsive control for the escapement device keeps the pawl from engaging a ratchet tooth during gradual descent of the ramp, but on an initial sudden downward movement of the strut, the pawl engages the ratchet teeth and prevents the free downward movement of the ramp.

U.S. Pat. No. 3,877,102 is also directed to a safety construction for a dockboard which is associated with the cross traffic legs. In the disclosure of U.S. Pat. No. 3,877,102, the legs are coupled to the lip of the dockboard through a releasable latch mechanism which includes an acceleration responsive element. Under rapid descent of the ramp, the increased acceleration of the ramp will actuate the acceleration responsive element to release the latch mechanism and enable the legs to return under the force of biasing springs to the supporting position, independent of the position of the lip to, thereby support the ramp against further descent.

SUMMARY OF THE INVENTION

The present invention relates to a safety leg construction which is an improvement to that disclosed in U.S. Pat. No. 3,877,102. In the construction of the invention, the supporting legs are hinged to the front edge of the ramp and are biased toward an upright supporting position, but can be pivoted to a retracted position. Each leg is provided with a series of abutments which are adapted to engage fixed supports on the frame of the dockboard to thereby support the ramp in a series of different elevations.

A coupling member is pivoted to each supporting leg and the coupling member carries a forward extending abutment which is adapted to be engaged by a cam connected to the lip. As the lip is moved from the pendant to the elevated position, the cam will operate against the abutment on the coupling member to thereby pivot the coupling member and the leg to the retracted position. An acceleration responsive latching element is pivoted to the ramp and is adapted to normally latch the coupling member to the leg, so that the leg, the coupling member and the latching element will move as a unit between the supporting position and the retracted position.

Under conditions of normal slow descent of the ramp, when the truck pulls away from the dock after the loading operation is completed, the lip will pivot downwardly toward the pendant position and the supporting legs will be urged toward the supporting position by the biasing means, so that one of the abutments on the legs will engage the fixed support to limit further descent of the ramp. However, under conditions of sudden gravitational descent of the ramp, which can occur if a load, such as a lift truck, is on the ramp, when truck pulls away from the dock, the increased acceleration of the ramp will actuate the acceleration responsive latching elements to release the coupling members and enable the biasing means to move the supporting legs to the upright supporting position, independently of the position of the lip and the coupling member. The legs will then engage the fixed supports on the frame to limit further downward movement of the ramp.

The construction of the invention is a simplified structure which is associated with the supporting legs and acts to limit both normal slow descent of the ramp, as well as rapid descent.

Other objects and advantages will appear in the course of the following description.

DESCRIPTION OF THE DRAWINGS

The drawings illustrate the best mode present contemplated of carrying out the invention.

In the drawings.

DESCRIPTION OF THE PREFERRED EMBODIMENT

Figure 1:
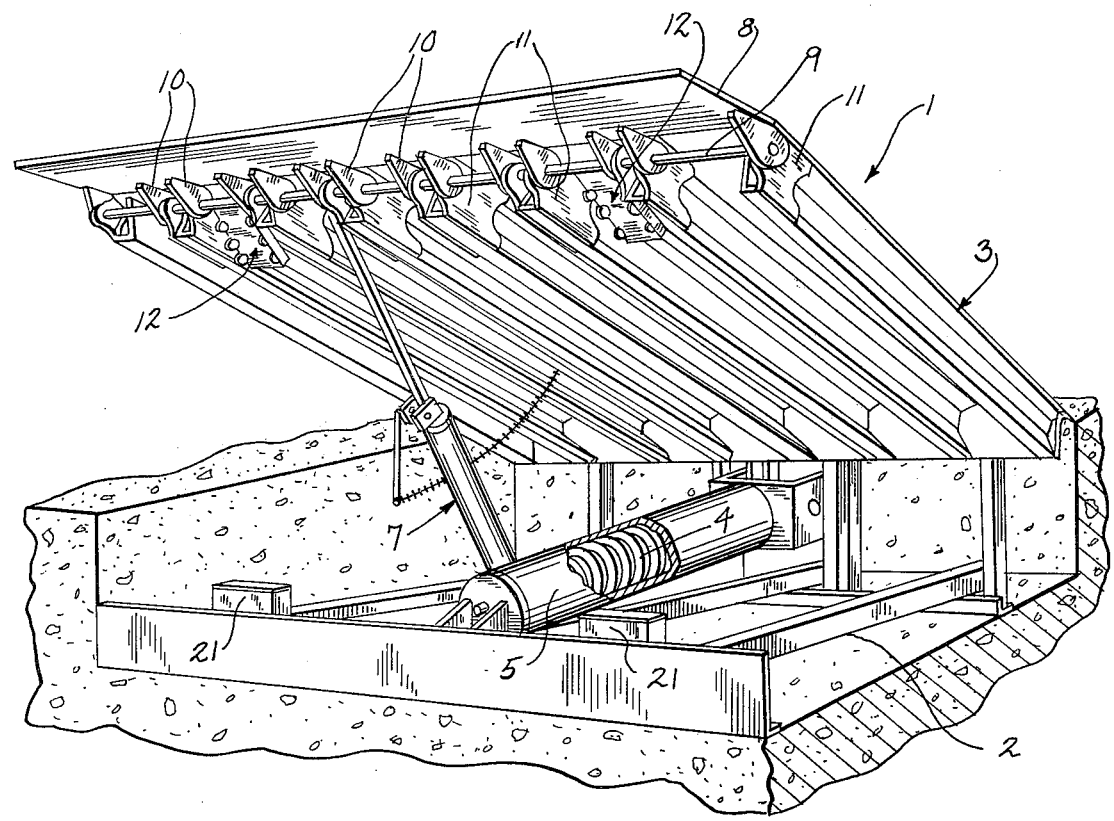
FIG. 1 is a perspective view of a dockboard incorporating the safety leg construction of the invention with the ramp shown in the elevated position and the legs retracted.

FIG. 1 illustrates a dockboard 1, similar to that disclosed in the U.S. Pat. No. 3,528,118, which is adapted to be mounted in a pit or depression in a loading dock. The dockboard 1 includes a frame 2 or supporting structure and a ramp 3 is hinged at its rear edge to the frame 2. The ramp 3 is adapted to be biased upwardly to an inclined position by a spring 4 mounted within a tube 5 attached to frame 2. The rear end of the spring 4 bears against the frame 2, while the forward end of the spring is secured to a rod, not shown, that extends through the spring and is attached at its rear end to a pair of lever arms 6. The upper ends of the lever arms are secured to the rear edge of the ramp.

The force of the spring 4, if unrestrained, will act to pivot the lever arms 6 forwardly, to thereby pivot the ramp 3, to the upwardly inclined position, as shown in FIG. 1.

The ramp can be held in any desired position by means of a holddown mechanism 7, as disclosed in U.S. Pat. No. 3,137,017. The hold down mechanism 7 is a uni-directional device which prevents the upward movement of the ramp unless released, while permitting free downward movement of the ramp.

As illustrated in FIG. 1, an extension lip 8 is pivoted to the forward edge of the ramp 3. To provide the pivotal connection, a hinge pin 9 extends through aligned openings in lugs 10 attached to the underside of the lip, as well as through openings in beam extensions 11 which extend forwardly from the ramp. With this construction, the lip can be pivoted from a downwardly hanging pendant position to an extended position in which the lip forms an extension to ramp.

The dockboard 1 also includes a lip lifting and latching mechanism, not shown, similar to that disclosed in U.S. Pat. Nos. 3,137,017 and 3,117,332. The lifting and latching mechanism serves to automatically move the lip from the pendant or downwardly hanging position to the extended position as the ramp is moved upwardly from the horizontal to the upwardly inclined position. The lip lifting and latching mechanism also serves to latch or hold the lip in the partially extended position.

In normal operation the upper surface of the ramp 3 will be generally horizontal or flush with the upper surface of the dock. As a truck backs toward the dock the operator will release the hold down mechanism 7 through operation of a manually operated cable, thereby enabling the spring 4 to pivot the ramp to the upwardly inclined position. As the ramp moves upwardly, the lip lifting and latching mechanism will move the lip 8 to the partially extended position and latch the lip in this position. With the ramp 3 in the inclined position, as shown in FIG. 1, the operator then walks outwardly on the ramp and the weight of the operator in combination with the weight of the ramp will overcome the force of the spring assembly 4, thereby enabling the ramp to lower slowly until the lip 8 engages the bed of the truck or carrier. When the lip engages the truck bed, the lip latching mechanism will release, enabling the lip to freely pivot downwardly to the pendant position when the truck moves away from the dock. Alternately, the lip can be extended and latched in the extended position as the ramp is walked down from its inclined position by a lip lifting and latching mechanism, as disclosed in the U.S. Pat. No. 3,997,932.

In accordance with the invention, the dockboard 1 includes a pair of legs 12, each of which is pivoted by hinge pin 13 to lugs 14 which extend downwardly from the undersurface of the ramp 3. Legs 12 are composed of a web 15 and side walls 16 which are joined to the sides of the web.

To urge the legs 12 forwardly to an upright supporting position, a torsion spring 17 is wound around the pivot pin 13. One end 18 of the torsion spring bears against the web 15 of the respective leg 12, while the opposite end 19 of the torsion spring bears against the undersurface of the ramp 3. A reinforcing angle 20 is secured to the undersurface of the ramp and the end 19 of the spring extends through a hole in the angle 20. The angle 20 serves to stiffen the ramp against impact caused by the supporting legs 12 engaging the fixed supporting members 21 on the frame and also serves to retain the torsion spring in proper position.

To limit the forward movement of the legs 12 with respect to the ramp 3 under the force of the springs 17, a stop lug 22 is secured to the forward surface of each web 15 and the upper surface of the stop will engage the hinge pin 9 to restrict the forward pivotal movement of the leg.

Each of the legs 12 is provided with a series of punched out tabs, the lower surfaces of which form abutments 23 that are adapted to engage the fixed supports 21 mounted on the supporting frame 2. Engagement of the lower end of each leg 12 with the respective support 21 will support the ramp in a generally horizontal cross traffic position, while engagement of each horizontally aligned pair of abutments 23 with the support 21 will serve to support the ramp in one of a series of downwardly inclined elevations. It is contemplated that the legs 12 can be provided with any number of abutments 23 which can support the ramp in a series of above dock level positions and below dock level positions.

Figure 3:
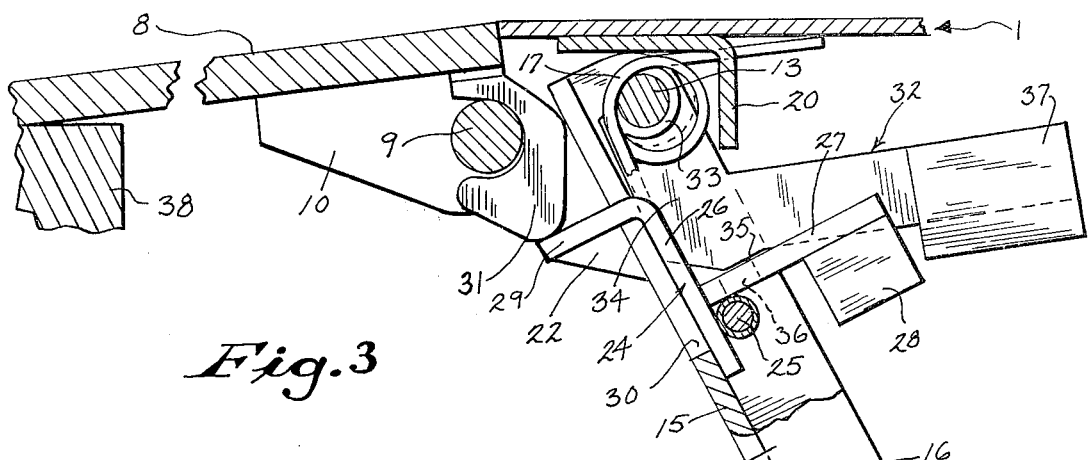
FIG. 3 is a view similar to FIG. 2 with the lip extended and supported on the bed of a carrier and the legs retracted.
Figure 4:
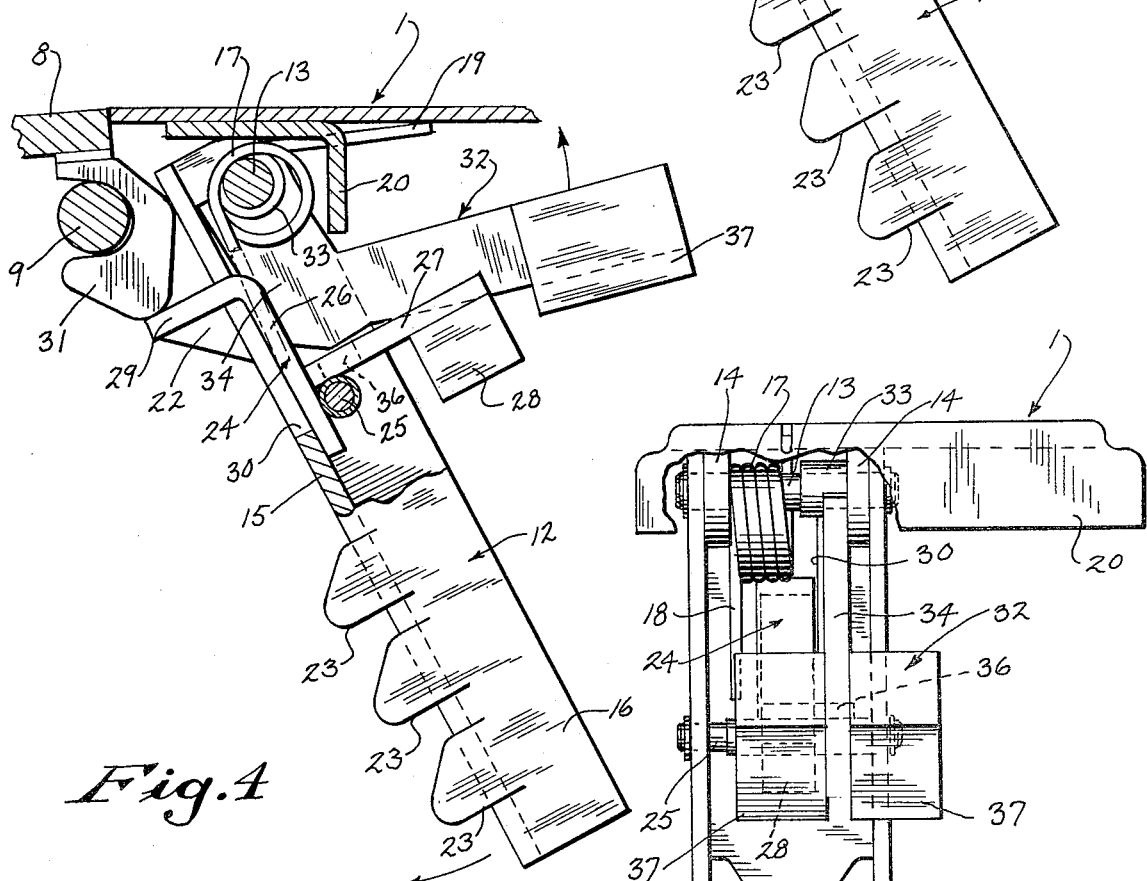
FIG. 4 is a view similar to FIG. 2 showing the latch mechanism in the release position under conditions of rapid descent of the ramp.
Figure 5:
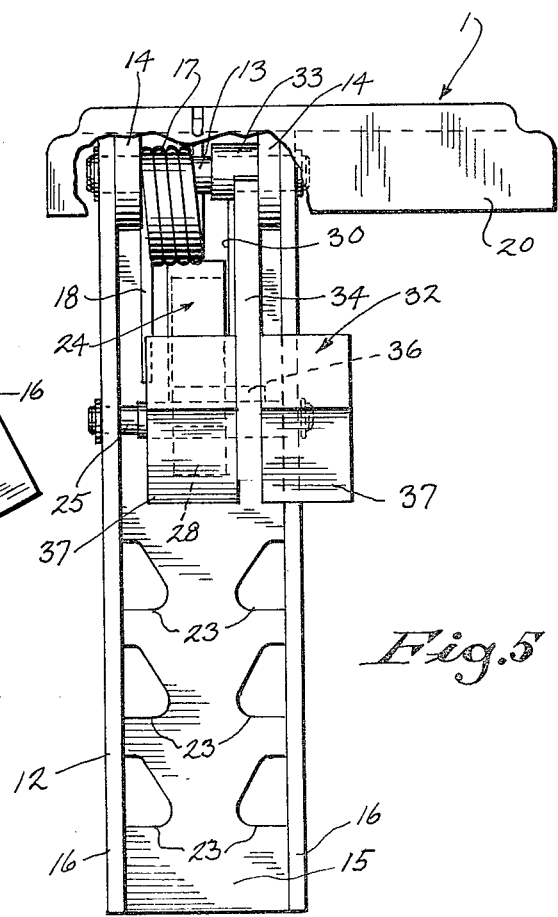
FIG. 5 is a rear view of the structure shown in FIG. 2.

A coupling member 24 is pivotally connected to the side walls 16 of each leg 12 by a pivot pin 25. The coupling member 24 includes a section 26 which under normal conditions is disposed flatwise against the web 15 of the leg, and a second section 27 which extends rearwardly from section 26 and carries a weight 28. The upper end of the section 26 is provided with a forwardly extending arm or lug 29 which is located beneath the hinge pin. The lug 29 extends through an opening 30 in the web 15 of the leg and is adapted to be engaged by a lip cam 31 which is welded or otherwise secured to the lip 8. As the lip is pivoted from the downwardly hanging pendant position to the extended position by means of the lip lifting and latching mechanism 11, the cam 31 will ride against the lug 29 to pivot the coupling member 24 and the leg 12 to the rearward retracted position, as shown in FIG. 3.

Figure 2:
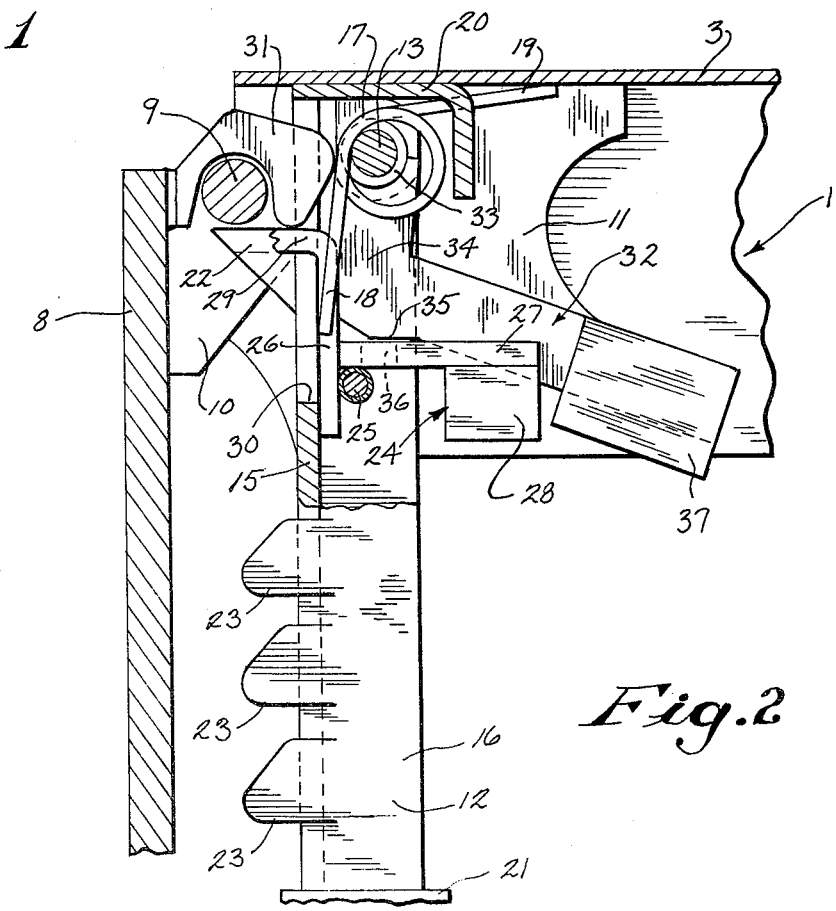
FIG. 2 is a fragmentary side elevation of the dockboard with the ramp in the cross traffic position and the lip in the pendant position.

An acceleration responsive latch member 32 is employed to normally latch the coupling member 24 to the leg 12 and prevent relative pivotal movement between the leg and the coupling member. The latch member 32 includes an upper tubular end 33 which is mounted for rotation on pivot pin 13 and the central section 34 of the latch member bears against the web 15 of the leg and terminates in a latching surface 35 which is adapted to engage a plug 36 on the coupling member 24. The outer end of the latch member 32 is provided with a weight 37 which, as shown in FIG. 2, tends to urge the latch member in a clockwise direction into a latching position.

In operation of the dockboard, the operator, after a truck is backed into position adjacent the dock, will manually release the hold down mechanism 7 thereby enabling the counterbalancing spring assembly 4 to pivot the ramp 3 to the upper inclined position, as shown in FIG. 1. As the ramp pivots upwardly, the lip lifting and latching mechanism will act to move the lip from the pendant position to the partially extended position and to lock the lip in that position. Alternately, instead of lifting the lip on upward movement of the ramp, the lip can be lifted on downward movement of the ramp through use of the mechanism shown in U.S. Pat. No. 3,997,932. In either case, as the lip 8 moves to the extended position, the wiper member or cam 31 will ride against the arm 29 to move the leg 12 to the retracted position, as shown in FIG. 3. As the lip engages the truck bed 38 on further downward movement of the ramp, the lip will move to the fully extended position, thereby releasing the lip latching mechanism 11 and enabling the lip to pivot freely downwardly to the pendant position when the truck pulls away from the dock.

When the truck pulls away from the dock, the lip 8 will fall from the extended position to the pendant position enabling the legs 12 to pivot forwardly to the upright supporting position under the force of the torsion springs 17. If the ramp is above dock level when the truck pulls away, the lower ends of the legs 12 will engage the supports 21 to support the ramp at dock level. However, if the ramp is below dock level, when the truck pulls away from the dock, one of the abutments 23 will engage the upper end of the respective supports 21 to support the dockboard in a below dock level position.

If the truck pulls away from the dock and an added load is on the ramp, such as a fork lift truck, the added load will cause a rapid descent of the ramp. It has been found that the stored up energy, due to compression of the pneumatic tires of the fork lift truck, will act to push the ramp downwardly with snap action when the truck pulls away from the dock, so that the ramp will descend faster than a gravitational descent. With the present invention, the rapid descent of the ramp will cause the weight 37, which constitutes an acceleration responsive element, to swing upwardly relative to the ramp, thereby releasing the latching engagement between the latch member 32 and the coupling member 24. With the latching engagement released, the legs 12 will be free to move independently of the coupling member 24 and will be biased to the upright supporting position through the action of the torsion spring 17. This biasing action occurs independent of the position of the lip 8 and the coupling member 24. The weight on the end of the coupling member 24 serves as a biasing means to urge the coupling member, after disengagement with the leg, to its original position as shown in FIG. 2.

If the ramp is at an above dock level position when the rapid descent begins, the lower ends of the legs 12 will engage the fixed supports 21 to limit further descent of the ramp, but if the ramp is at a below dock level position when the rapid descent begins, one of the pair of abutments 23 will engage the fixed supports. Thus, the supporting legs construction of the invention will serve to catch or limit descent of the ramp on both conditions of slow normal descent and under conditions of rapid, accelerated descent.

Various modes of carrying out the invention are contemplated as being within the scope of the following claims particularly pointing out and distinctly claiming the subject matter which is regarded as the invention.

I claim:

1. In a dockboard, a supporting structure, a ramp structure hinged at its rear edge to the supporting structure and movable from a generally horizontal position to an upwardly inclined position, a lip hinged to the front edge of the ramp structure and pivotable from a downwardly hanging pendant position to an extended position where the lip forms an extension to the ramp structure, a fixed support connected to one of said structures, a leg hinged to the other of said structures at a first pivot and pivotable between an upright ramp supporting position and a retracted inoperable position, biasing means engaged with the leg to bias the leg to the supporting position, a coupling member pivoted to the leg at location spaced from said first pivot, said coupling member having an abutment disposed forwardly of the leg, latch means interconnecting the leg and the coupling member for preventing relative pivotal movement between said leg and said coupling member, a wiper member connected to the lip and engageable with the abutment whereby movement of the lip from the pendant position to the extended position will pivot the coupling member and said leg about said first pivot to move of the leg from the upright supporting position to the retracted position, said latch means including an acceleration responsive element responsive to a predetermined rapid downward acceleration of the ramp structure caused by descent of the ramp structure with an added load thereon for releasing said latch means and disconnecting said coupling means from said leg, whereby the leg will be pivoted to the supporting position by said biasing means independently of the coupling member.

2. The dockboard of claim 1, wherein said leg is pivoted at said first pivot to the ramp structure and said fixed support is connected to said supporting structure.

3. The dockboard of claim 2, wherein said acceleration responsive element comprises a weight mounted on the outer end portion of said latch means.

4. The dockboard of claim 2, and including second biasing means for normally biasing said coupling member into a fixed position with respect to said leg.

5. The dockboard of claim 1, wherein said latch means includes a first latch element disposed to engage the leg and a second latch element disposed to engage the coupling member.

6. In a dockboard, a supporting frame, a ramp hinged at its rear edge to the frame and movable from a generally horizontal position to an upwardly inclined position, a fixed support connected to the frame, a leg pivotally connected to the ramp at a first pivot and pivotable between an upright supporting position and a retracted position, biasing means to bias the leg to the supporting position, a coupling member pivoted to the leg at second pivot spaced from the first pivot and having an abutment extending forwardly of the leg, and latch means pivotally connected to the ramp at said first pivot and having a latching position wherein said latch means prevents relative movement between said leg and said coupling member and having a released position, second biasing means for biasing the latch means to the latching position, means connected to the lip and engageable with said abutment for pivoting the leg and the coupling member about said first pivot on movement of the lip from the pendant position to the extended position, and means responsive to predetermined rapid downward acceleration of the ramp caused by descent of the ramp with an added load thereon for releasing said latch means whereby the leg will be moved to the supporting position independent of the coupling member by said biasing means.

7. The dockboard of claim 6, wherein said means connected to the lip comprises a cam.

8. The dockboard of claim 6, wherein said latch means comprises an arm having one end connected to the ramp at the first pivot and said means responsive to rapid downward acceleration of the ramp comprises a weight connected to the other end of the arm.

* * * * *

UNITED STATES PATENT AND TRADEMARK OFFICE
CERTIFICATE OF CORRECTION

PATENT NO. : 4,328,602

DATED : May 11, 1982

INVENTOR(S) : DAVID E. BENNETT

It is certified that error appears in the above-identified patent and that said Letters Patent are hereby corrected as shown below:

Col. 1, line 45 Cancel "the", first occurrence; Col. 2, line 50, Cancel "present" and substitute therefor ---presently---;
Col. 6, line 26, CLAIM 1, Cancel "of".

Signed and Sealed this

Twenty-first Day of September 1982

[SEAL]

Attest:

GERALD J. MOSSINGHOFF

Attesting Officer

Commissioner of Patents and Trademarks